United States Patent [19]

Martin

[11] Patent Number: 4,474,738

[45] Date of Patent: Oct. 2, 1984

[54] PROCESS FOR MINERAL BENEFICIATION

[76] Inventor: R. Torrence Martin, Chipmunk Crossing, Lincoln, Mass. 01773

[21] Appl. No.: 425,292

[22] Filed: Sep. 28, 1982

[51] Int. Cl.$^3$ .............................................. C01B 25/22
[52] U.S. Cl. .................................... 423/157; 423/155; 423/167; 423/DIG. 14
[58] Field of Search ........ 423/167, 155, 157, DIG. 14

[56] References Cited

U.S. PATENT DOCUMENTS

| | | |
|---|---|---|
| 2,238,586 | 4/1941 | Foerster . |
| 2,905,526 | 9/1959 | McCullough . |
| 3,437,379 | 4/1969 | Dunseth . |
| 3,450,633 | 6/1969 | Siemers ............................... 423/167 |
| 3,576,661 | 4/1971 | Cochran . |
| 4,042,666 | 8/1977 | Rice et al. .......................... 423/167 |
| 4,044,107 | 8/1977 | Houghtaling ...................... 423/167 |
| 4,113,184 | 9/1978 | Loughrie ............................ 423/167 |
| 4,177,243 | 12/1979 | Schwartz et al. ................... 423/167 |
| 4,196,172 | 4/1980 | Ore . |
| 4,201,747 | 5/1980 | Minagawa . |

FOREIGN PATENT DOCUMENTS

| | | | |
|---|---|---|---|
| 2204568 | 6/1974 | France ............................... 423/167 |
| 2248878 | 5/1975 | France ............................... 423/167 |
| 2366067 | 4/1978 | France ............................... 423/167 |
| 0919199 | 2/1963 | United Kingdom ............... 423/167 |
| 0421366 | 3/1974 | U.S.S.R. ............................. 423/167 |

OTHER PUBLICATIONS

"Methods of Soil Analysis", Part 1, 1965, C. A. Black; Published by Assn. Soc. Agron, Madison, Wis.
"Pretreatment for Mineralogical Analysis," G. W. Kunze, pp. 568–569, (1965).

Primary Examiner—John Doll
Assistant Examiner—Wayne A. Langel
Attorney, Agent, or Firm—Yount & Tarolli

[57] ABSTRACT

The present invention is directed to the removal of phosphorous material, such as apatite from phosphorous bearing materials, preferably those having a particle size less than 0.25 mm. The beneficiation treatment process comprises treating an aqueous phosphatic slurry with an alkaline EDTA complexing material. After contacting the aqueous mineral slurry with the complexing agent for a sufficient period of time, the divalent cation of apatite is complexed with the complexing material, which in turn releases the associated anionic species of apatite into solution for removal and recovery.

8 Claims, No Drawings

PROCESS FOR MINERAL BENEFICIATION

BACKGROUND OF THE INVENTION

1. Field of Invention

This invention relates to the art of mineral beneficiation of phosphorous containing materials. More specifically, the invention relates to the removal of apatite from phosphatic materials having a particle size less than 0.25 millimeter (hereinafter mm).

2. Background of the Invention

Sediments mined in Florida for phosphate ore contain approximately one third ore (apatite) [$Ca_5$(F or Cl)($PO_4$)$_3$], one third quartz, and one third clay. Apatite is a relatively insoluble material. The usual order of abundance of clay species is: smectite, palygorskite, illite and kaolin.

The +105 micrometer (hereinafter $\mu$m) size ore is separated from sand and clay by wet sieving and flotation procedures. The −105 $\mu$m fraction is waste clay containing up to 30% of the total phosphorous that was present in the original sediment. At present this phosphorous is lost through disposal of the waste clay slurry.

Such a loss of raw materials containing phosphorous is costly. This invention reduces this waste. Such a process also diminishes the waste associated with phosphorous mining and promotes the conservation of natural resources.

SUMMARY OF THE PRESENT INVENTION

The present invention is directed to a mineral beneficiation process of phosphorous containing materials. The present invention is particularly useful in removing phosphorous materials. such as apatite, from phosphorous bearing materials having a particle size less than 0.25 mm.

The beneficiation treatment process comprises treating an aqueous phosphatic slurry with a complexing material of ethylenediaminetetraacetic acid treated with NaOH to raise the pH of the solution (hereinafter alkaline EDTA). After contacting the aqueous mineral slurry with the complexing agent for a sufficient period of time, the divalent cation of the apatite is complexed with the complexing material, which in turn releases the associated anionic species into solution for removal and recovery.

The aqueous phosphatic slurry generally contains about 0.5% to about 50% by weight of mineral ore. The alkaline EDTA complexing agent is added to the slurry at a rate proportional to the amount of divalent species to be removed, preferably on a 1:1 mole basis. The pH is adjusted to fall in the range from about 6 to about 10, preferably in the range of about 6 to about 9, and most preferably about 8. The pH can be adjusted before or after the complexing agent is added.

DESCRIPTION OF PREFERRED EMBODIMENT

The present mineral beneficiation process can be used to increase recovery of phosphorous materials from the mineral bearing materials. Preferably, the phosphorous bearing materials to be treated have a particle size less than 0.25 mm. The apatite material to be removed from the mineral has a divalent calcium cation and an associated phosphorous bearing anion. The associated anion with the divalent cation is placed into solution for removal or recovery as explained in more detail below; in the case of phosphorous recovery from phosphorous bearing minerals, the phosphorous is part of the anion.

The mineral to be treated in accordance with the present invention is mixed with water to form an aqueous slurry, preferably about 0.5% to about 50% by weight—all percentages herein being by weight unless otherwise stated. The solids concentration can be increased within those limits provided that the final slurry is sufficiently fluid to permit good mixing for reagent-mineral contact and the amount of complexing agent is increased accordingly. The aqueous mineral slurry is then treated with a complexing material.

The complexing material is preferably an 0.1M EDTA solution prepared by adding to the EDTA enough NaOH to bring the pH of the solution to a pH of about 8. The aqueous mineral slurry is contacted with the complexing material for a sufficient period of time to allow the divalent apatite cation to be complexed with the complexing material. Formation of the complexed divalent cation releases the associated anion into solution. The anion can then be removed from the solution and recovered if desired. To assist in the formation of a complex divalent species with the complexing material, the aqueous slurry, before or after addition of the complexing material, is adjusted to a pH in the range of about 6 to about 10, preferably in the range of about 6 to about 9, most preferably about 8.

The amount of alkaline EDTA complexing material to be added depends on the amount of material to be removed. The amount of material removed is directly proportional (nonlinear) to the amount of alkaline EDTA added to the mineral. A preferred amount of alkaline EDTA to be added is 1:1 mole ratio with the amount of divalent species present. The alkaline EDTA complexing material is permitted to contact the mineral ore in the aqueous slurry for a sufficient period of time to allow the formation of the complexed divalent species.

Complexing the divalent cation with the alkaline EDTA releases the associated phosphorous bearing anion into solution. The associated anion can then be removed from the slurry, which in the case of phosphorous removal from clays permits increased phosphorous recovery.

The EDTA complexing material can be removed by known processes. For example, the solution bearing the complexed divalent species and the associated anion can be treated with sulphuric acid to precipitate gypsum. The supernatant can then be acidified to a pH of about 2 where the EDTA precipitates.

EXAMPLES

The present invention was used in treating various phosphorous containing materials. The following examples show that increased productivity results from use of the present invention in treating waste clay slurries from a phosphorous processing operation.

Phosphorous Bearing Materials

The following analsyes were performed on several mineral samples. Three phosphatic waste clays from central Florida were used to cover the extreme clay mineral range and an average waste clay. The −1 $\mu$m fraction (i.e., particles less than one micrometer) from the three waste clays contained apatite and a trace of quartz in addition to clay minerals. The dominant clay species in sample PA was palygorskite ($Mg_3$ or $Al_2$)($Si_4O_{10}$(OH)$_2H_2O$) with some smectite. The clay in sample MO was mainly smectite. The clay minerals present in sample PC were smectite, palygorskite, illite and kaolin.

Sample Separation and Pretreatment

In order to expel salts or any other flocculating agents for testing purposes, the slurry samples were washed by combining approximately three liters of 10% slurry with three liters of distilled water. After shaking the resulting 5% slurry, the solids were allowed to settle and the clear supernatant was decanted. This procedure was repeated until sediments remained suspended for several hours; generally three of four washings were required.

A flocculated clay aggregate in solution does not exhibit the same physical behavior as its individual crystal components. Clay particles must be completely deflocculated in order to obtain accurate size fractionation. A fraction less than 1 $\mu$m in size was separated from the 5% bulk slurry in the following manner. In the case of PC, the 5% slurry was diluted with distilled water to 2%; slurries of PA and MO were diluted to 1%. Separation of the $-1$ $\mu$m fraction from the slurry was done by settling velocity differentiation using the Stoke's Law Method which is based on the settling velocity of a small sphere in a fluid. After vigorously shaking the slurry, the smaller particles would settle out at a slower rate than the larger particles in accordance with Stoke's Law. After about 14 hours and 50 minutes at 20° C., only particles less than 1 $\mu$m remained in the top 5 cm of the container, which portion was decanted into a separate container. Scanning Electron Microscopy (SEM) was used to confirm the particle grain size as being less then 1 $\mu$m.

The exchange complexes of the clay particles in $-1$ $\mu$m fraction were made homoionic to sodium. Uniformity within exchangeable cations was achieved by repeated washings with 0.1 Molar NaCl which served to saturate these exchange sites with sodium. An equal volume of 0.1 Molar NaCl was added to a volume of the $-1$ $\mu$m fraction slurry. This mixture was shaken vigorously and then centrifuged for five minutes at 2600 rpm. The supernatant was then decanted, and this procedure was repeated two more times. After the final supernatant from the NaCl washing was decanted, the sediment was washed several times with a minimum volume of distilled water to remove excess salt and to concentrate the sample.

With the separation complete, the clay slurry samples, both bulk and $-1$ $\mu$m fractions, were ready for treatment. Control samples of the bulk and $-1$ $\mu$m fractions were left untreated for the control group.

Sample Treatment

An equal volume of 0.1 M alkaline EDTA was added to a 10 ml representative sample of each of the prepared samples. The bulk PC slurry had a solids content of 10% by weight whereas the $-1$ $\mu$m fractions contained 3% solids by weight. The treated slurry samples were then homogenized and adjusted to a pH of about 8 with 1 Molar NaOH.

The pH adjusted, treated slurry samples were shaken by an automatic shaking device for about 15-16 hours to facilitate reagent-mineral contact. Further experiments have shown that contact times as low as 40 minutes are as effective as 9-16 hours. After shaking, the treated slurries were centrifuged at 2600 rpm for 10 minutes. The clear supernatant was decanted and saved ("Liquid Extract"). The remaining mineral slurry samples were subject to three distilled water washings described above in the pretreatment section. A minimum amount of water (2-3ml) was added to the slurries and labelled "treated" for analysis.

The foregoing sample pretreatment and treatment preparation steps (other than the pH adjustment step) were necessary for experimental testing purposes only to show the effectiveness of the present invention. Those steps are not necessary for the use of the present invention as described and claimed herein.

ANALYSIS

To establish that the above described method had removed phosphorous from the PC bulk and $-1$ $\mu$m fraction slurries, the treated sediments were subjected to X-ray diffraction (XRD), scanning electron microscopy (SEM), Energy Dispersive X-ray Emission Spectroscopy (EDAX) and Petrographic Microscopy.

Powder specimens were obtained by air drying a representative sample from each slurry which was then crushed to pass a sieve with 74 $\mu$m openings. The powders were then packed into sample holders for XRD so as not to produce any preferred orientation. As many as 20 apatite diffraction peaks were observed in the XRD data from untreated specimens. The two strong characteristic apatite peaks at d spacings of 2.81A° and 2.72A° were not detected in any of the EDTA treated specimens.

TABLE 1

|  | EDAX | |
| --- | --- | --- |
|  | Ca | p |
| PC bulk untreated | 35 | 35 |
| treated | 10 | 10 |
| PC-1 um untreated | 20 | 20 |
| treated | 5 | 10 |
| PA-1 um untreated | 40 | 40 |
| treated | 10 | 10 |
| MO-1 um untreated | 25 | 25 |
| treated | not detected | |

The X-ray diffraction and EDAX results in Table 1 demonstrate that the present invention is an effective means of removing phosphorous from mineral slurries in bulk as well as the $-1$ $\mu$m fraction. Phosphorous is extracted as part of the apatite removed by alkaline EDTA. Apatite removal from phosphatic clays by use of alkaline EDTA was surprising because of the relative insolubility of apatite.

What is claimed is:

1. A process of mineral beneficiation of phosphorous containing materials comprising:
    forming an aqueous slurry of a phosphorous containing material having a first component of relatively insoluble apatite comprising a divalent cation and an associated phosphorous bearing anion,
    treating the aqueous phosphatic slurry with an alkaline EDTA complexing material,
    contacting the aqueous phosphatic slurry with the complexing material for a sufficient period of time to complex the divalent cation of the apatite with the complexing material, thereby releasing the associated anion into solution, and
    removing the phosphorous bearing anion and complexed divalent cation from the slurry.

2. A process as claimed in claim 1 wherein the pH of the slurry is adjusted to a pH in the range of about 6 to about 10.

3. A process as claimed in claim 2 wherein the complexing material is recovered for reuse.

4. A process as claimed in any one of claims 1-3 wherein the complexing material is 0.1M EDTA-NaOH solution.

5. A process as claimed in claim 4 wherein the complexing material is added to the phosphatic slurry in a molar ratio equal to or greater than the divalent species to be complexed and the aqueous slurry is in the range of about 0.5% to about 50% by weight of mineral ore.

6. A process as claimed in claim 2 wherein the pH is adjusted to a pH in the range of about 6 to about 9.

7. A process as claimed in claim 6 wherein the pH is adjusted to a pH of about 8.

8. A process as claimed in any one of claims 1-3 wherein the phosphorous containing materials have a particle size less than 0.25 mm.

* * * * *